United States Patent
Nam et al.

(10) Patent No.: US 8,810,564 B2
(45) Date of Patent: Aug. 19, 2014

(54) APPARATUS AND METHOD FOR REDUCING THREE-DIMENSIONAL VISUAL FATIGUE

(75) Inventors: Dong Kyung Nam, Yongin-si (KR); Hyung Chul Li, Seoul (KR)

(73) Assignees: Samsung Electronics Co., Ltd., Suwon-si (KR); Kwangwoon University Industry-Academic Collaboration Foundation, Seoul (KR)

( * ) Notice: Subject to any disclaimer, the term of this patent is extended or adjusted under 35 U.S.C. 154(b) by 373 days.

(21) Appl. No.: 12/926,490

(22) Filed: Nov. 22, 2010

(65) Prior Publication Data

US 2011/0267338 A1    Nov. 3, 2011

(30) Foreign Application Priority Data

May 3, 2010  (KR) ........................ 10-2010-0041247

(51) Int. Cl.
    *G06T 15/00*    (2011.01)
(52) U.S. Cl.
    USPC ............................................. 345/419
(58) Field of Classification Search
    CPC .................................................. H04N 13/0022
    See application file for complete search history.

(56) References Cited

U.S. PATENT DOCUMENTS

| | | | |
|---|---|---|---|
| 6,417,969 B1 * | 7/2002 | DeLuca et al. | 359/630 |
| 6,985,290 B2 * | 1/2006 | Putilin et al. | 359/462 |
| 7,400,431 B2 * | 7/2008 | Schwerdtner et al. | 359/23 |
| 8,218,855 B2 * | 7/2012 | Kim et al. | 382/154 |
| 8,284,235 B2 * | 10/2012 | Held et al. | 348/42 |
| 8,314,832 B2 * | 11/2012 | Mann et al. | 348/51 |
| 2004/0165264 A1 * | 8/2004 | Uehara et al. | 359/462 |
| 2007/0047040 A1 * | 3/2007 | Ha | 359/24 |
| 2008/0112616 A1 * | 5/2008 | Koo et al. | 382/171 |
| 2009/0040295 A1 * | 2/2009 | Koo et al. | 348/42 |
| 2009/0096863 A1 * | 4/2009 | Kim et al. | 348/42 |

FOREIGN PATENT DOCUMENTS

| | | |
|---|---|---|
| JP | 2003-018619 | 1/2003 |
| JP | 2004-289527 | 10/2004 |
| JP | 2006-178900 | 7/2006 |
| JP | 2009-104198 | 5/2009 |
| JP | 2009-135686 | 6/2009 |
| KR | 10-2003-0021293 | 3/2003 |
| KR | 10-2007-0030849 | 3/2007 |
| KR | 10-2008-0022968 | 3/2008 |
| KR | 10-2008-0088305 | 10/2008 |
| KR | 10-2009-0079089 | 7/2009 |

OTHER PUBLICATIONS

Sumio Yano, Masaki Emoto, Tetsuo Mitsuhashi, "Two factors in visual fatigue caused by stereoscopic HDTV images", Displays, vol. 25, Issue 4, Nov. 2004, pp. 141-150, ISSN 0141-9382.*

* cited by examiner

*Primary Examiner* — Kee M Tung
*Assistant Examiner* — William Beutel
(74) *Attorney, Agent, or Firm* — Staas & Halsey LLP

(57) ABSTRACT

Disclosed are an apparatus and method for reducing 3D visual fatigue that a user feels when viewing a 3D image. An optimal 3D image may be regenerated and displayed without causing 3D visual fatigue and thus, it is possible to significantly reduce the 3D visual fatigue.

13 Claims, 10 Drawing Sheets

FIG. 8

| USER-TO-SCREEN DISTANCE / USER-TO-3D OBJECT DISTANCE | 0.2D (5m) | 1D (1m) | 2D (50cm) | 3D (33cm) |
|---|---|---|---|---|
| 0.05D (20m) | 2.59 | 3.32 | 4.08 | 4.55 |
| 0.2D (5m) | 2.18 | 3.01 | 3.93 | 4.53 |
| 0.5D (2m) |  | 2.50 |  |  |
| 0.8D (1.25m) | 3.85 |  |  |  |
| 1D (1m) |  | 2.36 | 3.43 | 4.48 |
| 1.2D (83cm) | 4.12 |  |  |  |
| 1.5D (67cm) |  | 3.78 | 3.41 |  |
| 2D (50cm) |  | 3.96 | 3.19 | 3.92 |
| 2.2D (45cm) | 4.13 |  |  |  |
| 2.5D (40cm) |  |  | 3.75 | 3.84 |
| 3D (33cm) | 3.78 | 4.02 | 4.15 | 3.46 |

APPARATUS AND METHOD FOR REDUCING THREE-DIMENSIONAL VISUAL FATIGUE

CROSS-REFERENCE TO RELATED APPLICATIONS

This application claims the priority benefit of Korean Patent Application No. 10-2010-0041247, filed on May 3, 2010, in the Korean Intellectual Property Office, the disclosure of which is incorporated herein by reference.

BACKGROUND

1. Field

One or more embodiments of the following description relate to an apparatus and method for reducing three-dimensional (3D) visual fatigue that a user feels when viewing a 3D image. More particularly, one or more embodiments of the following description relate to an apparatus and method for reducing 3D visual fatigue that may estimate a user-to-screen distance from a screen to a user, may calculate a user-to-3D object distance based on the estimated user-to-screen distance and a parallax of a 3D image, may predict 3D visual fatigue of the user based on the estimated user-to-screen distance and the calculated user-to-3D object distance, and may control the 3D image based on the predicted 3D visual fatigue.

2. Description of the Related Art

A three-dimensional (3D) image or a stereoscopic image refers to an image that enables a user to experience a realistic stereoscopic effect based on different parallax images viewed by left and right eyes of the user.

A method of displaying a 3D image is referred to as a 3D display method, and is broadly classified into a viewpoint representation method and an aerial image display method.

The viewpoint representation method may enable each viewpoint image to be displayed on a display device, to represent images corresponding to left and right eyes of a user. The viewpoint representation method may include, for example, a stereoscopic display method and a multi-view display method.

In the viewpoint representation method, each viewpoint image may appear on a display screen in the same manner as a two-dimensional (2D) display method.

The aerial image display method may enable voxels, namely pixels suspended in space, to be formed to generate a 3D image, regardless of a concept of a viewpoint. A representative example of the aerial image display method includes a holographic display method.

The 3D display method has an advantage in that a highly realistic 3D representation enables a highly immersive video experience. However, since different image information is represented based on left and right viewpoints, visual fatigue is highly likely to occur compared with a 2D image.

Visual fatigue caused by the 3D display method is known as 3D visual fatigue.

3D visual fatigue may occur due to various causes. Severe fatigue may cause headaches, dizziness, or vomiting.

The 3D visual fatigue may be caused by unnatural depth information of images viewed by left and right eyes, or by a conflict between the two eyes.

A representative example of the conflict includes a convergence-accommodation conflict that may frequently occur in most 3D display methods.

A fatigue level may be increased when a 3D image is displayed relatively far away from a screen.

Despite a long history of research, a problem of 3D visual fatigue caused by the 3D display method still remains.

Even a recent 3D display method is unable to overcome the problem of 3D visual fatigue since various and complex factors cause 3D visual fatigue, and there is no standardized means for measuring and evaluating the fatigue level. Additionally, any systematic method of removing and reducing visual fatigue is not established.

In particular, it is impossible to fundamentally solve a fatigue phenomenon caused by the above-described convergence-accommodation conflict, when considering characteristics of the viewpoint representation method. The fatigue phenomenon has been regarded as a main problem occurring when viewing a 3D image with a high stereoscopic effect.

Accordingly, there is a demand to solve the 3D visual fatigue phenomenon, considered as a main weak point of 3D display, in order to achieve commercialization and market expansion of the 3D display.

SUMMARY

The foregoing and/or other aspects are achieved by providing an apparatus of reducing three-dimensional (3D) visual fatigue, the apparatus including a viewing distance estimator (detector) to estimate (detect) a user-to-screen distance from a screen to a user, a 3D image analyzer to calculate a user-to-3D object distance based on the estimated (detected) user-to-screen distance and a parallax of a 3D image, a 3D visual fatigue predictor to predict 3D visual fatigue of the user based on the estimated (detected) user-to-screen distance and the calculated user-to-3D object distance, and a 3D image controller to control the 3D image based on the predicted 3D visual fatigue.

The foregoing and/or other aspects are achieved by providing a method of reducing 3D visual fatigue, the method including estimating (detecting) a user-to-screen distance from a screen to a user, calculating a user-to-3D object distance based on the estimated (detected) user-to-screen distance and a parallax of a 3D image, predicting 3D visual fatigue of the user based on the estimated (detected) user-to-screen distance and the calculated user-to-3D object distance, and controlling the 3D image based on the predicted 3D visual fatigue.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which:

FIG. 8 illustrates a table of a 3D visual fatigue model according to embodiments;

DETAILED DESCRIPTION

Figure 1:
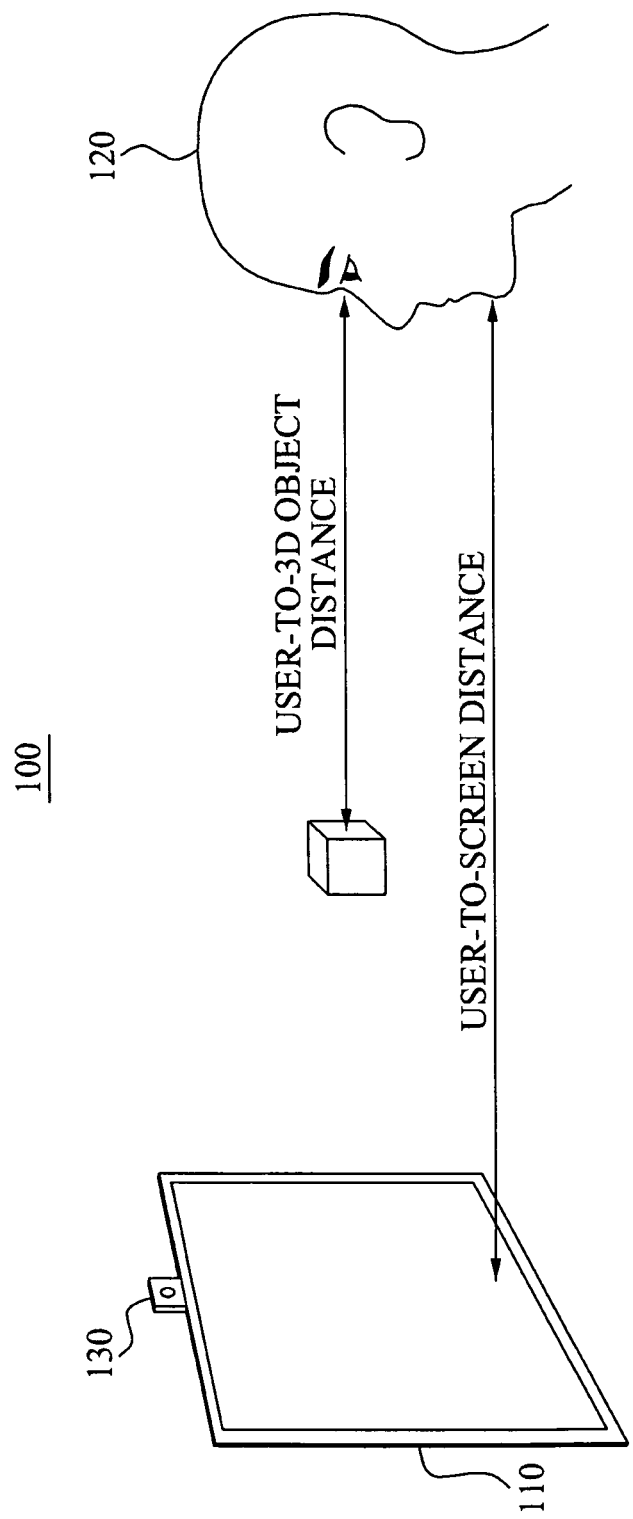
FIGS. 1 through 3 illustrate diagrams of a principle of a three-dimensional (3D) image according to embodiments.

Reference will now be made in detail to embodiments, examples of which are illustrated in the accompanying drawings, wherein like reference numerals refer to the like elements throughout. Embodiments are described below to explain the present disclosure by referring to the figures.

Figure 2:
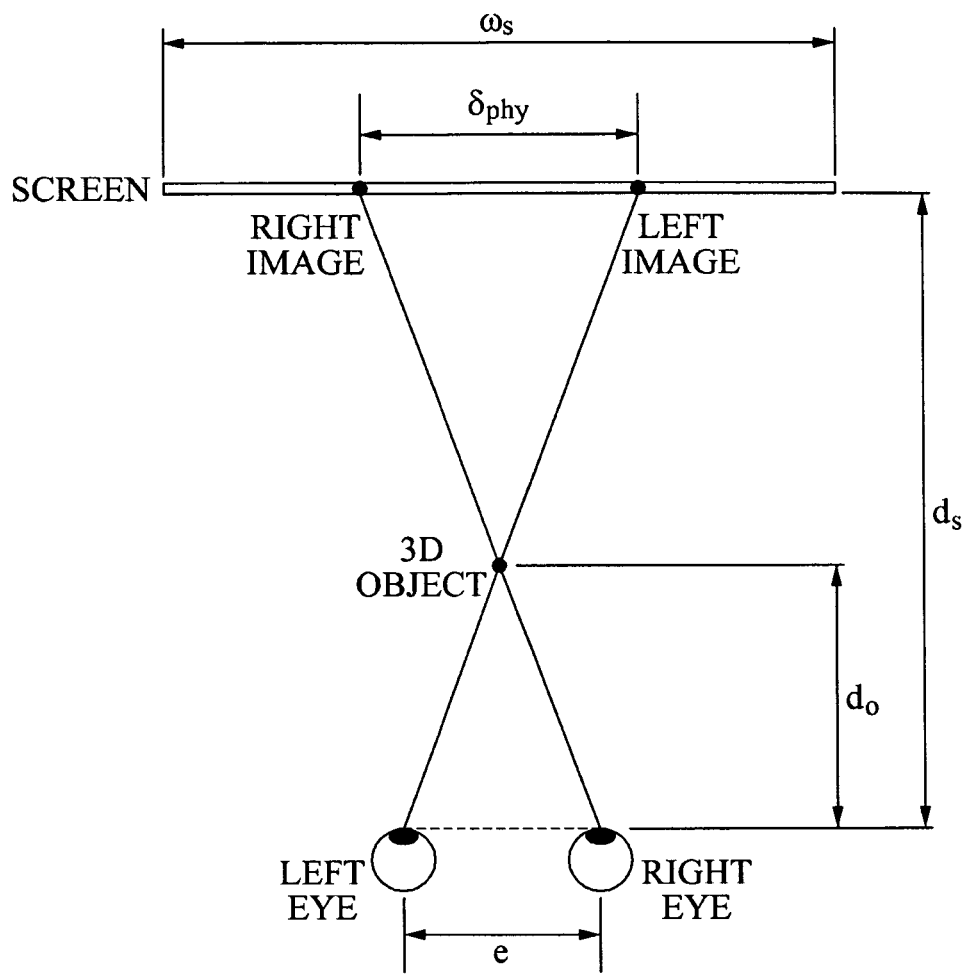
Figure 3:
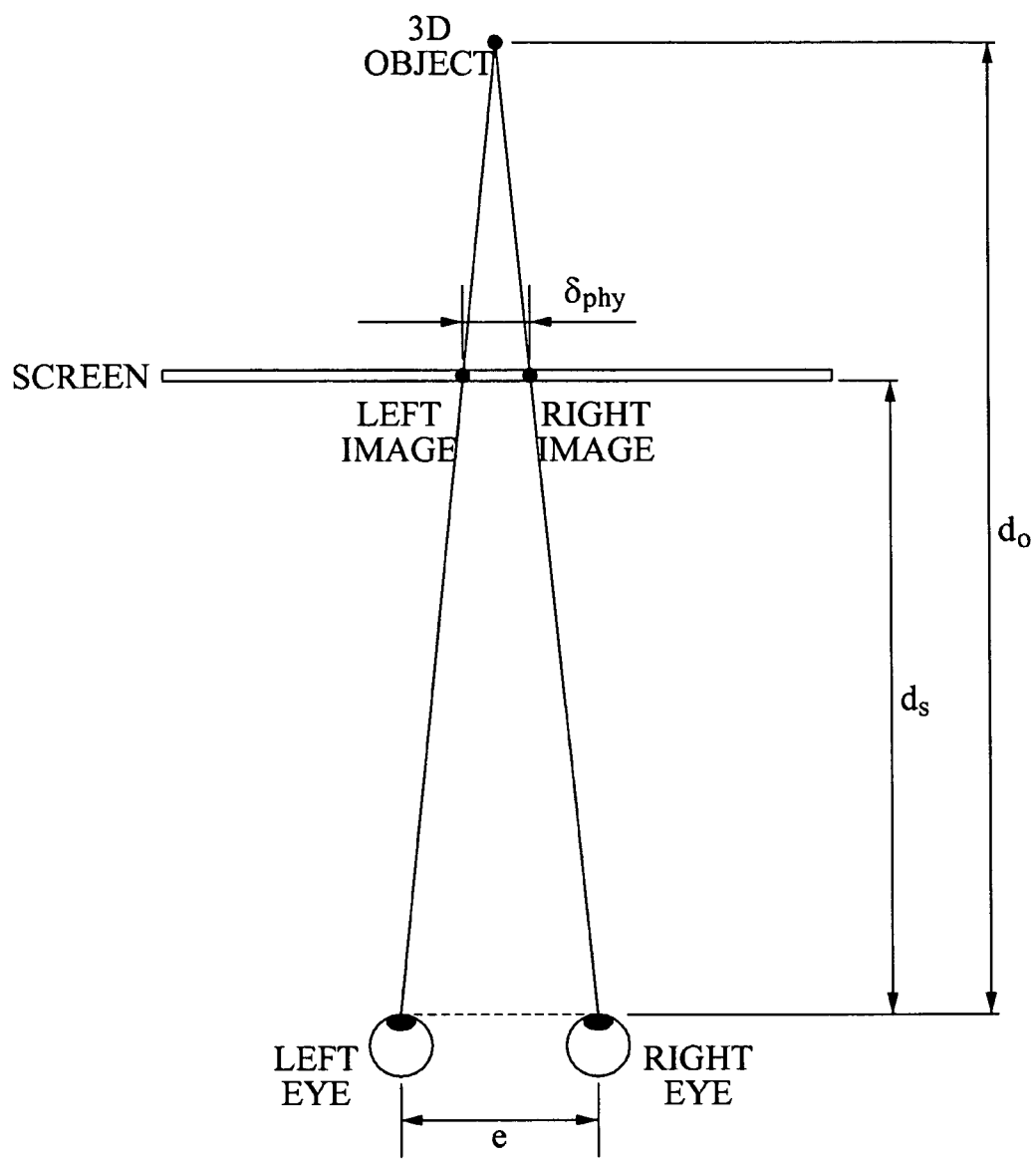

FIGS. 1 through 3 illustrate diagrams of a principle of a three-dimensional (3D) image according to embodiments.

Referring to FIG. 1, a 3D visual fatigue reducing apparatus may predict visual fatigue that a user 120 feels when viewing of a 3D image, based on a user-to-screen distance and depth information of the 3D image, for example a user-to-3D object distance according to an embodiment.

When the user 120 feels severe 3D visual fatigue, the 3D visual fatigue reducing apparatus may regenerate a 3D image with an optimal depth, and may control a display device to display the regenerated 3D image.

The 3D visual fatigue reducing apparatus may use a 3D visual fatigue model that is configured in advance to predict the 3D visual fatigue.

The 3D visual fatigue model may be obtained based on a user-to-screen distance $d_s$ and a user-to-3D object distance $d_o$.

The user-to-screen distance $d_s$ refers to a distance from eyes of the user 120 to a screen 110, and may be measured by a measuring device 130 that is mounted on the screen 110.

The user-to-3D object distance $d_o$ may be calculated based on a parallax of a 3D image, and the user-to-screen distance $d_s$.

The user-to-3D object distance $d_o$ will be further described with reference to FIGS. 2 and 3.

Referring to FIG. 2, the user 120 may experience an illusion that a 3D object appears to project from the screen 110, that is, experience an illusion that the 3D object appears between the screen 110 and the user 120.

Referring to FIG. 3, the user 120 may experience an illusion that the 3D object appears to be behind the screen 110.

In FIG. 3, a depth in a viewpoint representation method may be generated by a disparity between viewpoint images.

While only left and right viewpoint images are described in embodiments, the embodiments may also be applied to at least three viewpoint images.

When a pixel disparity between left and right images has a value of $\delta_{pix}$, a physical disparity $\delta_{phy}$ may be represented by the following Equation 1:

$$\delta_{phy} = \frac{\delta_{pix}}{R} w_s.$$ [Equation 1]

In Equation 1, $w_s$ denotes a width of a 3D display screen, and R denotes a horizontal resolution of the 3D display screen.

Additionally, since a 3D image may appear on an intersection between a straight line drawn from the left image to a left eye, and a straight line drawn from the right image to a right eye, the following Equation 2 may be completed:

$$\delta_{phy}:e = d_s - d_o:d_s.$$ [Equation 2]

In Equation 2, e may be interpreted as a distance between the left and right eyes.

In other words, the user-to-3D object distance $d_o$ of FIG. 2 may be computed by the following Equation 3:

$$d_o = \frac{e}{e + \delta_{phy}} d_s.$$ [Equation 3]

In FIG. 3, the user-to-3D object distance $d_o$ may be computed using Equation 2, and may be represented by the following Equation 4:

$$d_o = \frac{e}{e - \delta_{phy}} d_s.$$ [Equation 4]

As shown in Equations 1 through 4, the user-to-3D object distance $d_o$ may be determined based on the user-to-screen distance $d_s$ and the disparity. Accordingly, the disparity may be controlled to adjust the user-to-3D object distance $d_o$.

In a viewpoint 3D display method, eyes may converge on a location corresponding to the user-to-3D object distance $d_o$, while being focused on a location corresponding to the user-to-screen distance $d_s$.

In other words, it is possible to determine a level of a convergence-accommodation conflict based on parameters representing the user-to-3D object distance $d_o$ and the user-to-screen distance $d_s$.

Thus, the 3D visual fatigue reducing apparatus may predict 3D visual fatigue based on the level of the convergence-accommodation conflict.

Additionally, the 3D visual fatigue reducing apparatus may determine how much to change a user-to-3D object distance to represent a 3D image when severe fatigue occurs.

As a result, according to embodiments, it is possible to regenerate an optimal 3D image and display the regenerated 3D image so as to significantly reduce visual fatigue caused by viewing the 3D image.

Figure 4:
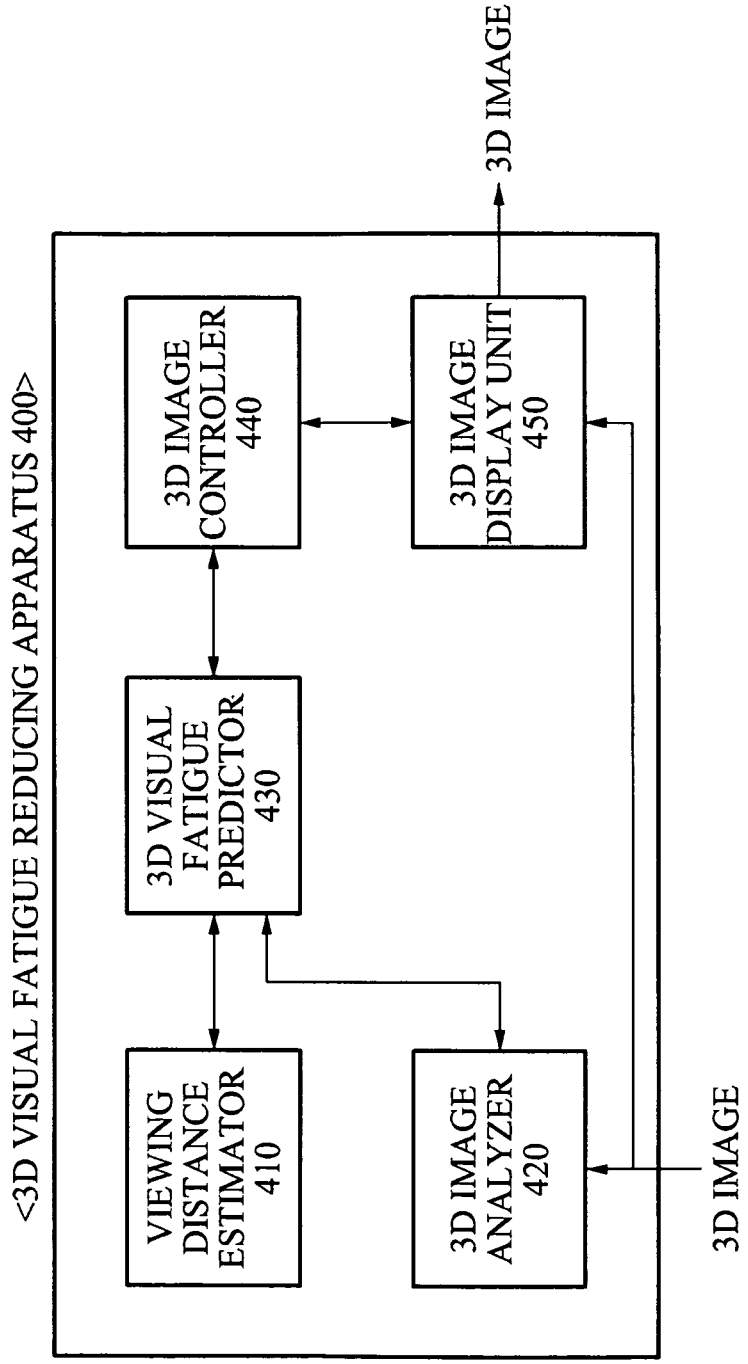
FIG. 4 illustrates a block diagram of a 3D visual fatigue reducing apparatus according to embodiments.

FIG. 4 illustrates a block diagram of a 3D visual fatigue reducing apparatus 400 according to embodiments.

The visual fatigue reducing apparatus 400 of FIG. 4 may include a viewing distance estimator 410, a 3D image analyzer 420, a 3D visual fatigue predictor 430, and a 3D image controller 440.

The 3D visual fatigue reducing apparatus 400 may further include a 3D image display unit 450 that is built therein to display a 3D image.

The viewing distance estimator (detector) 410 may estimate (defect) a user-to-screen distance from a user to a screen.

Specifically, the viewing distance estimator (detector) 410 may perform a function of estimating a location of the user spaced from the screen, and may calculate the user-to-screen distance based on information received by a predetermined measuring device (not shown).

To estimate (detect) the user-to-screen distance, the viewing distance estimator (detector) 410 may include at least one of a monocular camera, a stereo camera, a multi-camera, a depth measurement camera, an ultrasonic distance measurement sensor, an infrared distance measurement sensor, and a laser distance measurement sensor (not shown).

The 3D image analyzer 420 may calculate a user-to-3D object distance based on the estimated user-to-screen distance and a parallax of a 3D image. Here, the parallax of the 3D image refers to a displacement or difference.

The 3D image analyzer 420 will be further described with reference to FIG. 5 below.

Figure 5:
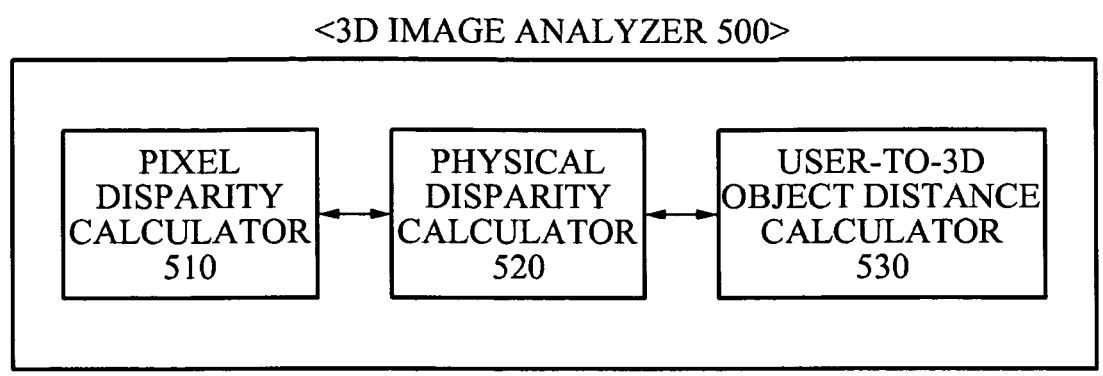
FIG. 5 illustrates a block diagram of a 3D image analyzer according to embodiments.

FIG. 5 illustrates a block diagram of a 3D image analyzer 500 according to embodiments. It is noted that the 3D image analyzer 500 is the same as 3D image analyzer 420 of FIG. 4.

The 3D image analyzer 500 of FIG. 5 may include a pixel disparity calculator 510, a physical disparity calculator 520, and a user-to-3D object distance calculator 530.

A 3D image may be formed of a plurality of 3D images including a first 3D image (not shown) and a second 3D image (not shown).

The pixel disparity calculator 510 may check the first 3D image and the second 3D image that form the 3D image.

Additionally, the pixel disparity calculator 510 may calculate a pixel disparity between the first 3D image and the second 3D image.

The physical disparity calculator 520 may reflect or account for a width and a horizontal resolution of the screen on the calculated pixel disparity, and may calculate a physical disparity.

The user-to-3D object distance calculator 530 may calculate a user-to-3D object distance based on the calculated pixel disparity and the calculated physical disparity.

The user-to-3D object distance calculator 530 may also calculate the user-to-3D object distance based on the calculated pixel disparity, the calculated physical disparity, and a distance between eyes of the user.

Figure 6:
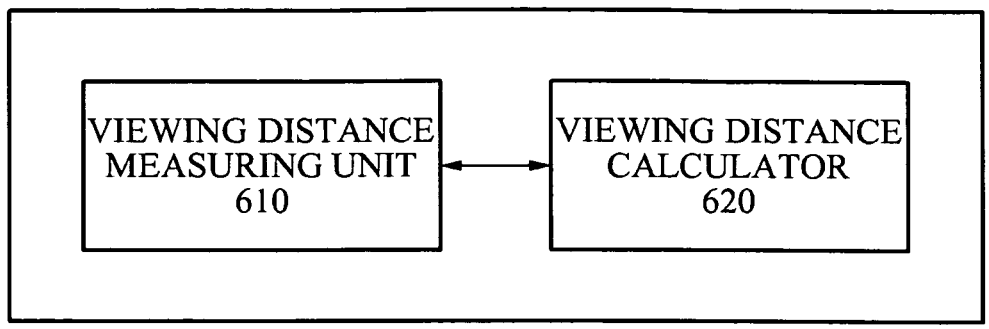
FIG. 6 illustrates a block diagram of a viewing distance estimator according to embodiments.

FIG. 6 further illustrates a block diagram of a viewing distance estimator 600 according to embodiments. The viewing distance estimator 600 is the same as viewing distance estimator 410 of FIG. 4.

The viewing distance estimator 600 of FIG. 6 may include a viewing distance measuring unit 610, and a viewing distance calculator 620.

The viewing distance measuring unit 610 may include at least one of a monocular camera, a stereo camera, a multi-camera, a depth measurement camera, an ultrasonic distance measurement sensor, an infrared distance measurement sensor, and a laser distance measurement sensor.

The viewing distance measuring unit 610 may measure a distance from a screen to a user, that is, a user-to-screen distance. The viewing distance calculator 620 may calculate the user-to-screen distance based on the measured distance by the viewing distance measuring unit 610.

Referring back to FIG. 4, the 3D visual fatigue predictor 430 may predict 3D visual fatigue of the user based on the estimated user-to-screen distance and the calculated user-to-3D object distance.

To predict the 3D visual fatigue of the user, the 3D visual fatigue predictor 430 may use a 3D visual fatigue model.

Figure 7:
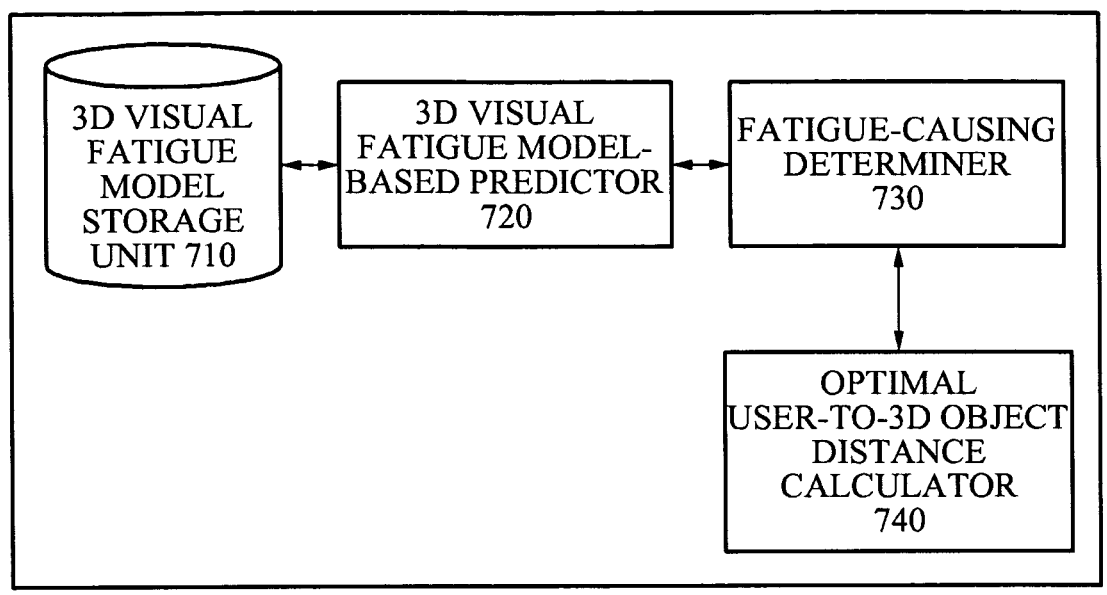
FIG. 7 illustrates a block diagram of a 3D visual fatigue predictor according to embodiments.

FIG. 7 illustrates a block diagram of a 3D visual fatigue predictor 700 according to embodiments.

The 3D visual fatigue predictor 700 of FIG. 7 may include a 3D visual fatigue model storage unit 710, a 3D visual fatigue model-based predictor 720, a fatigue-causing determiner 730, and an optimal user-to-3D object distance calculator 740.

The 3D visual fatigue model storage unit 710 may store a 3D visual fatigue model including 3D visual fatigue information regarding at least one user-to-screen distance and at least one 3D viewing distance.

The 3D visual fatigue model may be used as a parameter to regenerate a 3D image by reflecting or determining an optimal distance from the user to a 3D object to be represented, when a current 3D image is highly likely to cause 3D visual fatigue as a result of comparing and analyzing a calculated 3D visual fatigue level.

FIG. 8 illustrates a 3D visual fatigue model according to embodiments.

The 3D visual fatigue model may include information regarding a user-to-3D object distance corresponding to a user-to-screen distance, and may be represented in various forms.

For example, the 3D visual fatigue model may be represented in the form of a table as shown in FIG. 8.

Specifically, a level of 3D visual fatigue caused by viewing a 3D image may be measured at every test point, and may be represented as numerical values shown in the table of FIG. 8. Accordingly, the 3D visual fatigue model may enable a user to check the level of 3D visual fatigue.

For example, when a user observes a 3D image in a designated location, a 3D visual fatigue level for the user may be evaluated at each observational viewpoint. As shown in FIG. 8, the 3D visual fatigue level may be evaluated in the range from 1 to 7. However, it is not limited thereto.

Here, a numeral value of "1" means a lowest fatigue level, and a numeral value of "7" means a highest fatigue level indicating a severest fatigue state.

In the 3D visual fatigue model of FIG. 8, a 3D visual fatigue level that is lower than "4" may indicate that a user may feel less fatigue. Additionally, a 3D visual fatigue level that is equal to or higher than "4" may indicate that a user may feel relatively severe fatigue.

The 3D visual fatigue level may be measured for each user-to-screen distance $d_s$, and may be evaluated for each 3D image displayed for each user-to-3D object distance $d_o$.

When a sufficient amount of data is obtained, a 3D visual fatigue model according to embodiments may be generated by approximating a function of a user fatigue level.

The generated 3D visual fatigue model may be stored as a lookup table, or as an approximated function, and the stored model may be used later.

Referring back to FIG. 7, the 3D visual fatigue model-based predictor 720 may predict 3D visual fatigue based on the 3D visual fatigue model.

According to embodiments, when a currently displayed 3D image is located close to a screen, a fatigue level for a user may be reduced. Conversely, when the currently displayed 3D image is located relatively far away from the screen, the fatigue level may be increased.

The fatigue-causing determiner 730 may determine whether the 3D visual fatigue model causes the 3D visual fatigue.

Specifically, the fatigue-causing determiner 730 may determine, based on the 3D visual fatigue model, that 3D visual fatigue may occur when the fatigue level is equal to or greater than a predetermined reference value.

When the fatigue-causing determiner 730 determines an occurrence of the 3D visual fatigue, the optimal user-to-3D object distance calculator 740 may calculate an optimal user-to-3D object distance based on the 3D visual fatigue model.

Specifically, when a current 3D image is highly likely to cause the 3D visual fatigue, the optimal user-to-3D object distance calculator 740 may calculate an optimal user-to-3D object distance $d^*_o$ between a 3D object to be represented and a user, based on the 3D visual fatigue model.

The optimal user-to-3D object distance calculator 740 may use the calculated optimal user-to-3D object distance $d^*_o$ as a parameter used to regenerate a 3D image.

Referring back to FIG. 4, the 3D image controller 440 may control the 3D image based on the predicted 3D visual fatigue.

Specifically, the 3D image controller 440 may calculate an optimal physical disparity based on the calculated optimal user-to-3D object distance $d^*_o$. Additionally, the 3D image controller 440 may calculate an optimal pixel disparity, and may control a display device to regenerate or process a 3D image so that the fatigue level may be reduced.

Figure 9:
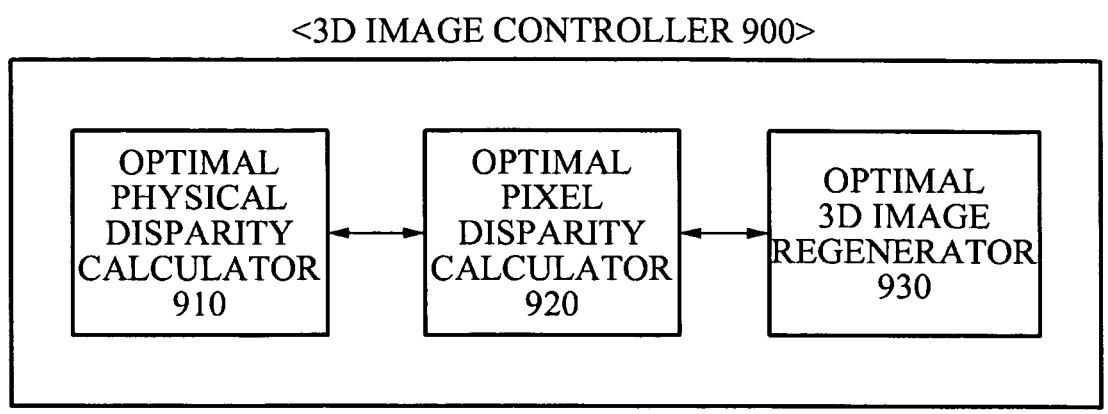
FIG. 9 illustrates a block diagram of a 3D image controller according to embodiments.

FIG. 9 illustrates a block diagram of a 3D image controller 900 according to embodiments.

As shown in FIG. 9, the 3D image controller 900 may include an optimal physical disparity calculator 910, an optimal pixel disparity calculator 920, and an optimal 3D image regenerator 930.

The optimal physical disparity calculator 910 may calculate an optimal physical disparity based on a calculated optimal user-to-3D object distance. The optimal pixel disparity calculator 920 may calculate an optimal pixel disparity based on the calculated optimal physical disparity.

The optimal 3D image regenerator 930 may regenerate a 3D image based on the calculated optimal physical disparity and the calculated optimal pixel disparity.

Figure 10:
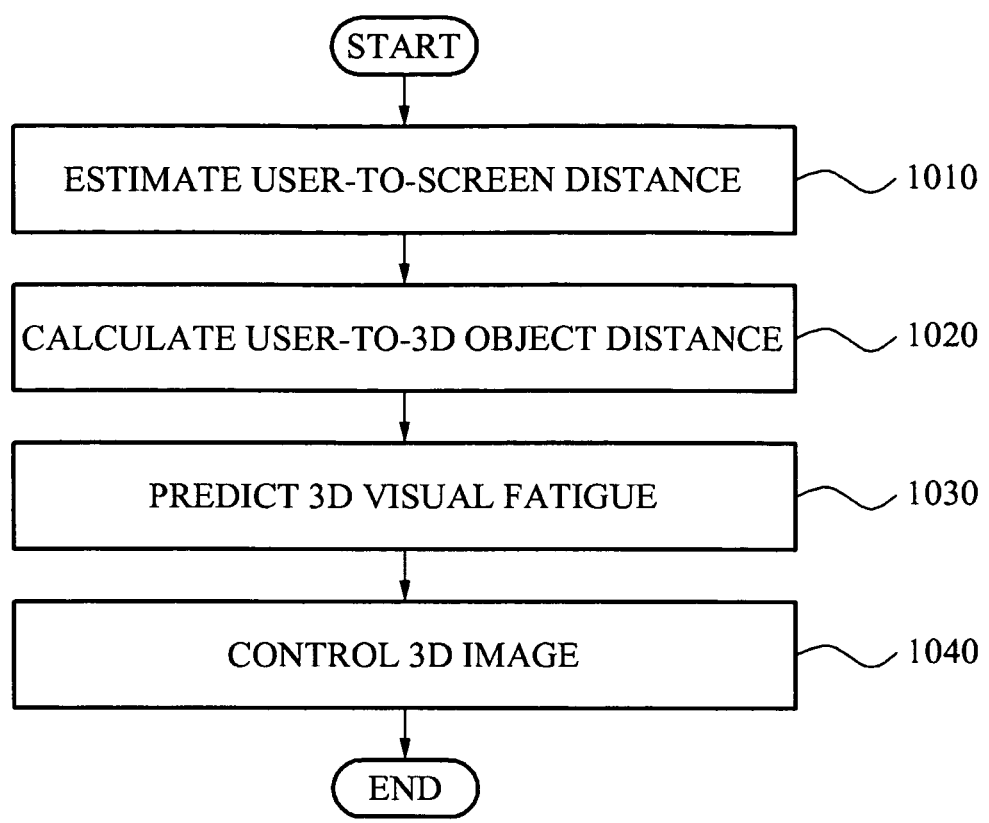
FIG. 10 illustrates a flowchart of a method of reducing 3D visual fatigue according to embodiments.

FIG. 10 illustrates a flowchart of a method of reducing 3D visual fatigue according to embodiments.

In operation 1010, a user-to-screen distance from a screen to a user may be estimated.

In operation 1020, a user-to-3D object distance may be calculated based on the estimated user-to-screen distance and a parallax of a 3D image.

To calculate the user-to-3D object distance, a first 3D image and a second 3D image may be read from among a plurality of 3D images that form a 3D image.

Subsequently, a pixel disparity between the first 3D image and the second 3D image may be calculated. Additionally, a physical disparity may be calculated by reflecting a width and a horizontal resolution of the screen on the calculated pixel disparity.

As a result, the user-to-3D object distance may be calculated based on the calculated pixel disparity and the calculated physical disparity.

In operation 1030, 3D visual fatigue of the user may be predicted based on the estimated user-to-screen distance and the calculated user-to-3D object distance.

Specifically, a 3D visual fatigue model may be stored, and the 3D visual fatigue of the user may be predicted based on the stored 3D visual fatigue model. Here, the 3D visual fatigue may occur when the user views a 3D image.

To predict the 3D visual fatigue model, a user-to-screen distance $d_s$ may be measured.

Subsequently, a pixel disparity may be calculated using Equation 1 based on the measured user-to-screen distance $d_s$ and information on an input 3D image.

Here, the pixel disparity may be converted into a physical disparity based on information on the width and horizontal resolution of the screen.

The physical disparity may be converted into a user-to-3D object distance $d_o$ using Equations 3 and 4. Here, to calculate the user-to-3D object distance $d_o$, a distance e between two eyes of the user may be set as a parameter, or may be estimated through a measurement.

When the user-to-screen distance $d_s$ and the user-to-3D object distance $d_o$ are calculated, a 3D visual fatigue level for a 3D image may be calculated based on the 3D visual fatigue model.

When a 3D visual fatigue level is equal to or higher than a threshold, a corresponding 3D image may be regenerated and the regenerated 3D image may be displayed. Conversely, when the 3D visual fatigue level is lower than the threshold, the 3D image may be directly displayed.

In operation 1040, the 3D image may be controlled based on the predicted 3D visual fatigue.

In the method of reducing 3D visual fatigue, a system may be controlled to regenerate a 3D image. Specifically, the 3D image may be regenerated in a reverse order to an order in which the 3D visual fatigue level is computed.

Additionally, an optimal user-to-3D object distance $d^*_o$ may be obtained based on the 3D visual fatigue model reflecting the user-to-screen distance $d_s$. An optimal physical disparity may be calculated using the following Equation 5:

$$\delta^*_{phy} = \frac{d_s - d^*_o}{d^*_o} e. \qquad \text{[Equation 5]}$$

The calculated optimal user-to-3D object distance $d^*_o$ may be again converted into an optimal pixel disparity using the following Equation 6:

$$\delta^*_{pix} = \frac{\delta^*_{phy}}{w_s} R. \qquad \text{[Equation 6]}$$

When the optimal pixel disparity is obtained using Equation 6, a 3D image may be regenerated.

Finally, the regenerated 3D image may be displayed by a 3D display.

An optimal user-to-3D object distance may be represented as $d_o$.

To reduce 3D visual fatigue according to embodiments, a 3D visual fatigue model may be configured.

Specifically, a user-to-screen distance and a user-to-3D object distance may be determined, and a physical disparity may then be calculated using Equation 5.

Subsequently, a pixel disparity may be calculated using Equation 6. Accordingly, a 3D image may be generated in a desired distance, and the generated 3D image may be displayed.

The 3D visual fatigue model may be generated through user evaluation. Specifically, a user may observe a displayed 3D image in a location spaced from a screen by a user-to-screen distance $d_s$, may evaluate a fatigue level, and may store the evaluated fatigue level.

Thus, it is possible to analyze content based on a 3D visual fatigue model, to identify a viewing environment, and to accurately estimate fatigue that a user feels. Accordingly, a user may be provided with a high quality 3D image without significantly causing fatigue regardless of a location from where the user views the 3D image.

As described above, according to embodiments, an optimal 3D image may be regenerated and the regenerated 3D image may be displayed and thus, it is possible to significantly reduce 3D visual fatigue caused by viewing the 3D image.

Additionally, according to embodiments, it is possible to analyze content based on a 3D visual fatigue model, to identify a viewing environment, and to accurately estimate fatigue that a user feels. Thus, a user may be provided with a high quality 3D image without significantly causing fatigue regardless of a location where the user views the 3D image.

The methods of reducing 3D visual fatigue according to the above-described embodiments may be performed in a computer and may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. An apparatus reducing three-dimensional (3D) visual fatigue, the apparatus comprising:
    a viewing distance estimator to determine a user-to-screen distance from a screen to a user;
    a 3D image analyzer to calculate a user-to-3D object distance based on the determined user-to-screen distance and a parallax of a 3D image;
    a 3D visual fatigue predictor to predict 3D visual fatigue of the user based on the determined user-to-screen distance and the calculated user-to-3D object distance; and
    a 3D image controller to control the 3D image based on the predicted 3D visual fatigue,
    wherein the 3D visual fatigue predictor comprises:
    a 3D visual fatigue model-based predictor to predict 3D visual fatigue based on a 3D visual fatigue model using the calculated user-to-3D object distance and determined user-to-screen distance, wherein the 3D visual fatigue model comprises 3D visual fatigue information regarding at least one user-to-screen distance and at least one user-to-3D object distance;
    a fatigue-causing determiner to determine whether the 3D visual fatigue model indicates an occurrence of 3D visual fatigue based on the predicted 3D visual fatigue, wherein the fatigue-causing determiner determines an occurrence of 3D visual fatigue if the predicted 3D visual fatigue is equal to or greater than a predetermined reference value; and
    an optimal user-to-3D object distance calculator to calculate an optimal user-to-3D object distance using the determined user-to-screen distance and at least one user-to-3D object distance from the 3D visual fatigue model, when the predicted 3D visual fatigue is equal to or greater than the predetermined reference value.

2. The apparatus of claim 1, wherein the 3D image analyzer comprises:
    a pixel disparity calculator to read a first 3D image and a second 3D image from the 3D image, and to calculate a pixel disparity between the first 3D image and the second 3D image;
    a physical disparity calculator to reflect a width and a horizontal resolution of the screen on the calculated pixel disparity, and to calculate a physical disparity; and
    a user-to-3D object distance calculator to calculate the user-to-3D object distance based on the calculated pixel disparity and the calculated physical disparity.

3. The apparatus of claim 2, wherein the user-to-3D object distance calculator calculates the user-to-3D object distance based on the calculated pixel disparity, the calculated physical disparity, and a distance between eyes of the user.

4. The apparatus of claim 1, wherein the viewing distance estimator comprises:
    a viewing distance measuring unit to measure the user-to-screen distance; and
    a viewing distance calculator to calculate the user-to-screen distance based on the measured distance.

5. The apparatus of claim 1, wherein the viewing distance estimator determines the user-to-screen distance using at least one of a monocular camera, a stereo camera, a multi-camera, a depth measurement camera, an ultrasonic distance measurement sensor, an infrared distance measurement sensor, and a laser distance measurement sensor.

6. The apparatus of claim 1, wherein the 3D visual fatigue predictor comprises:
    a 3D visual fatigue model storage unit to store the 3D visual fatigue model, the 3D visual fatigue model comprising the 3D visual fatigue information regarding at least one user-to-screen distance and at least one 3D viewing distance.

7. The apparatus of claim 6, wherein the 3D visual fatigue model is stored in a storage.

8. The apparatus of claim 7, wherein the stored 3D visual fatigue model is stored in a form of a lookup table or an approximated function.

9. The apparatus of claim 1, wherein the 3D image controller comprises:
    an optimal physical disparity calculator to calculate an optimal physical disparity based on the calculated optimal user-to-3D object distance obtained using the determined user-to-screen distance and at least one user-to-3D object distance from the 3D visual fatigue model;
    an optimal pixel disparity calculator to calculate an optimal pixel disparity based on the calculated optimal physical disparity; and
    an optimal 3D image regenerator to regenerate a 3D image based on the calculated optimal physical disparity and the calculated optimal pixel disparity.

10. The apparatus of claim 1, further comprising:
    a 3D image display unit to display a 3D image.

11. A method of reducing three-dimensional (3D) visual fatigue, the method comprising:
    determining a user-to-screen distance from a screen to a user;
    calculating a user-to-3D object distance based on the determined user-to-screen distance and a parallax of a 3D image;
    predicting 3D visual fatigue of the user based on the determined user-to-screen distance and the calculated user-to-3D object distance; and
    controlling the 3D image based on the predicted 3D visual fatigue,
    wherein the predicting comprises:
    predicting 3D visual fatigue based on a 3D visual fatigue model using the calculated user-to-3D object distance and determined user-to-screen distance, wherein the 3D visual fatigue model comprises 3D visual fatigue information regarding at least one user-to-screen distance and at least one user-to-3D object distance;
    determining whether the 3D visual fatigue model indicates an occurrence of 3D visual fatigue by determining based on the predicted 3D visual fatigue, wherein an occurrence of 3D visual fatigue is determined if the predicted 3D visual fatigue is equal to or greater than a predetermined reference value; and calculating an optimal user-to-3D object distance using the determined user-to-screen distance and at least one user-to-3D object distance from the 3D visual fatigue model, when the predicted 3D visual fatigue is equal to or greater than the predetermined reference value.

12. The method of claim 11, wherein the calculating comprises:

reading a first 3D image and a second 3D image from the 3D image, and calculating a pixel disparity between the first 3D image and the second 3D image;

reflecting a width and a horizontal resolution of the screen on the calculated pixel disparity, and calculating a physical disparity; and calculating the user-to-3D object distance based on the calculated pixel disparity and the calculated physical disparity.

13. A non-transitory computer-readable medium to store computer-readable instructions, that when executed, performs the method of:

determining a user-to-screen distance from a screen to a user;

calculating a user-to-3D object distance based on the determined user-to-screen distance and a parallax of a 3D image;

predicting 3D visual fatigue of the user based on the determined user-to-screen distance and the calculated user-to-3D object distance; and controlling the 3D image based on the predicted 3D visual fatigue, wherein the predicting comprises:

predicting 3D visual fatigue based on a 3D visual fatigue model using the calculated user-to-3D object distance and determined user-to-screen distance, wherein the 3D visual fatigue model comprises 3D visual fatigue information regarding at least one user-to-screen distance and at least one user-to-3D object distance;

determining whether the 3D visual fatigue model indicates an occurrence of 3D visual fatigue by determining based on the predicted 3D visual fatigue, wherein an occurrence of 3D visual fatigue is determined if the predicted 3D visual fatigue is equal to or greater than a predetermined reference value; and calculating an optimal user-to-3D object distance using the determined user-to-screen distance and at least one user-to-3D object distance from the 3D visual fatigue model, when the predicted 3D visual fatigue is equal to or greater than the predetermined reference value.

* * * * *